O. LEVILLY.
REGULATING DEVICE FOR REFRIGERATING PLANTS.
APPLICATION FILED JULY 8, 1907.
905,332.
Patented Dec. 1, 1908.
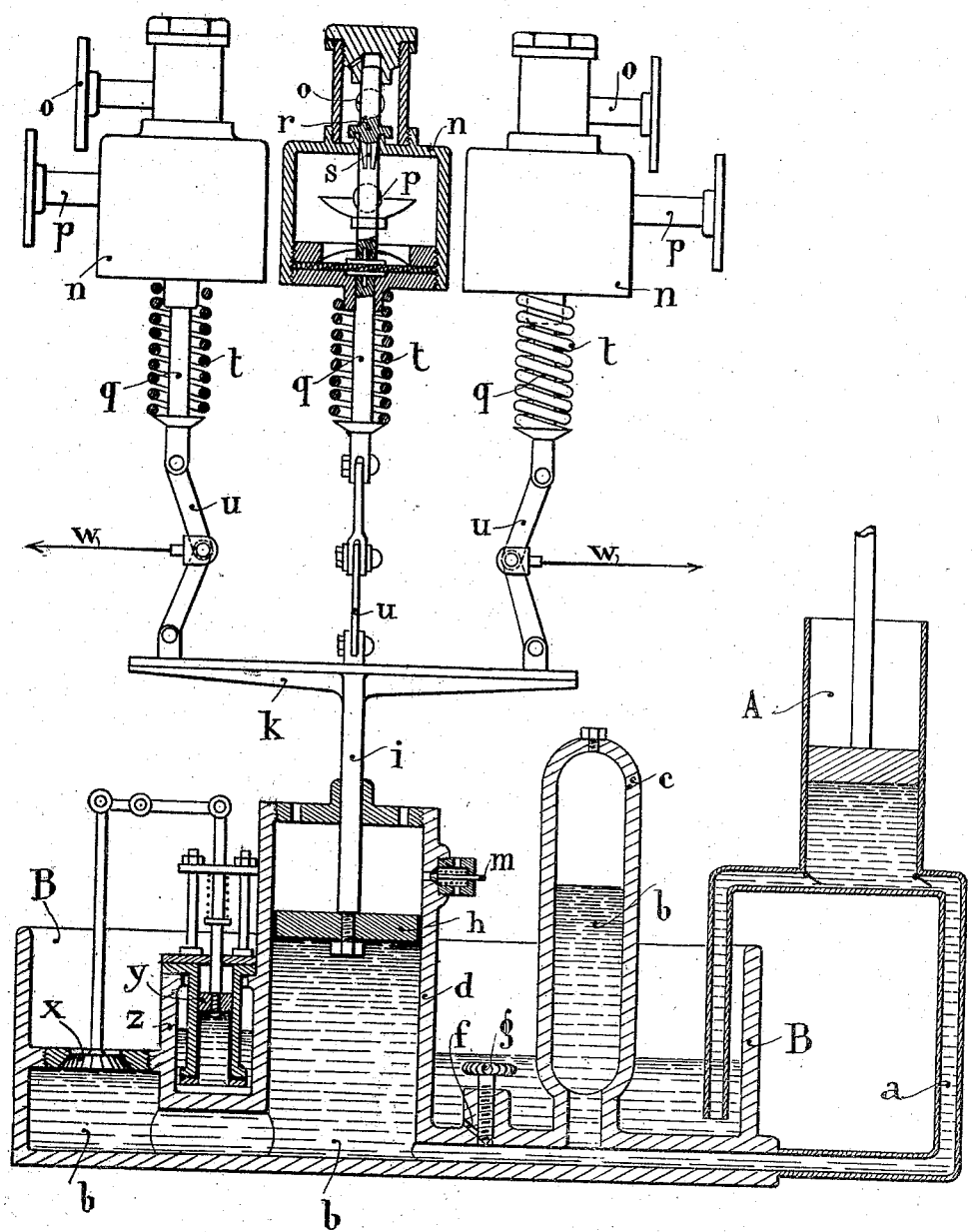

UNITED STATES PATENT OFFICE.

OLIVIER LEVILLY, OF PARIS, FRANCE.

REGULATING DEVICE FOR REFRIGERATING PLANTS.

No. 905,332.

Specification of Letters Patent.

Patented Dec. 1, 1908.

Application filed July 8, 1907. Serial No. 382,810.

*To all whom it may concern:*

Be it known that I, OLIVIER LEVILLY, citizen of the French Republic, residing at Paris, France, have invented certain new and useful Improvements in Regulating Devices for Refrigerating Plants, of which the following is a specification.

In refrigerating plants in which the cold is obtained through evaporating a volatile liquid and where the cold has to be obtained and maintained in several rooms at the same time, it is necessary, to regulate the admission of the fluid in the evaporators and rooms according to conditions which vary with the speed of the compressor used for liquefying the volatilized gas, with the pressure which exists in the evaporators from which depends the rapidity of evaporation, and finally, principally, according to the temperatures of the several rooms to be cooled.

The present invention concerns a simple apparatus destined to satisfy simultaneously and automatically all these conditions of regulation.

In the drawings the apparatus is shown by way of example in vertical section.

The apparatus essentially consists of a suitable pump A, which is operated from the shaft of the compressor at a speed equal to the speed of the compressor. This pump A aspires from a tank B, in which the apparatus is mounted, a suitable liquid such as oil for example, and forces this liquid through tube $a$ into a closed receptacle which comprises an air chamber $c$ forming a pressure regulator, a cylinder $d$ and a valve box. This valve-box communicates with the tank through an orifice $f$ which can be regulated by means of a pointed regulating screw $g$. In the cylinder $d$ a piston $h$ is movably arranged, the rod $i$ of which terminates in a plate $k$.

The regulating screw $g$ can, at any moment, be adjusted so that piston $h$ maintains itself at any desired position as long as the speed of the compressor will be the same; when the speed should vary, the piston will ascend or descend, so that its position always corresponds to the pressure of the oil $b$ contained in the receptacle. If, owing to an exceptionally great speed, the piston $h$ could get to the highest point of the ascending motion, it will open the outlet valve $m$ and, from this moment, all the liquid forced into the receptacle by the pump, will immediately flow back into the tank.

The plate $k$ fixed on piston $h$ operates the regulators of the outlets for the different evaporators. In the drawing three cooling rooms are supposed wherefor three evaporators are provided, to which the liquefied gas is distributed through regulating valves $n$. The liquid is supplied to said valves through the pipes $o$ and is conducted to the evaporators through the pipes $p$. Between the two pipes the regulating valve is arranged which consists of a rod $q$ supporting the valve $r$ and having conical incisions $s$; a strong spring $t$ tends to continuously maintain the valve $r$ pressed against its seat. The lower ends of the rods $q$ are connected with the plate $k$ of the piston rod through the links $u$, the pintles of which have each an arm to which is attached one end of a wire $w$, the other end of which is connected with the thermostat placed in the room corresponding to the regulator.

The valve-box $d$ has a valve $x$ which is connected to piston $y$ which is subjected to the differential action of the mercury in the cylinder $z$. The annular space of this cylinder communicates at any suitable point with the system of channels which connects the different evaporators with the compressor. Therefore, there will exist above the mercury in this annular space a constant pressure equal to the pressure which exists at the outlet ports of all the evaporators.

The operation of the regulator is as follows: Suppose the apparatus is in normal motion; in this case the compressor actuates the pump which forces the liquid $b$ under the piston $h$ and through the orifice $f$, which has been conveniently regulated, so that the pressure which therefrom is produced under the piston $h$ is exactly equalized by the pressure to which this piston is submitted under the influence of the weights which it supports and the different springs $t$. If now in any of the rooms to be cooled the temperature should rise above the fixed limit, the corresponding wire $w$ will exert a traction on the arm $v$ which tends to stretch the elbow-lever $u$ and consequently to further lift the valve $r$, $s$; when the temperature will have returned to the normal degree, the tension of wire $w$ will diminish and the spring $t$ will pull the valve $r$, $s$ back to its original position. If, for any reason, the speed of the compressor should increase, the piston $h$ would be lifted proportionally and would assume a novel position of equilibrium in which the different valves $r$, $s$ would be more open than before. When the pressure at the outlet ports of the evaporators should increase to an abnormal value, the piston $y$ would be lifted and open the valve $x$ wherefrom follows a sudden diminution of pressure in the closed receptacle $b$ and the piston $h$ will suddenly descend; at the beginning of the descending motion of the piston the links $u$ will stretch but, as the stroke of the piston is longer than the distance for which said levers can stretch, all valves $r$, $s$ will simultaneously be closed until the pressure in the evaporators has become normal, at which moment valve $x$ will close and piston $h$ will reassume its position of equilibrium. The same phenomena will be produced when the compressor should reduce its speed under a predetermined limit.

Obviously, the apparatus represented in the drawing is only shown by way of example and the constructional details can be altered; this is particularly the case with the valve $x$ for the opening of which a very great effort is required and which could be replaced by a valve-cock of suitable construction the rotation of which can be easily operated from piston $y$ and which would establish the communication between the receptacle $b$ and the oil tank.

What I claim as my invention, is:

A regulator for refrigerating machines which automatically regulates the supply of refrigerating fluid to the refrigerators of the different cooling rooms according to the speed of the compressor, and to the temperatures of the different cooling rooms, comprising in combination a circulation pump, an oil tank from which said pump aspires the oil, a closed receptacle into which the oil is forced by the pump communicating through an adjustable orifice with the oil tank and composed of an air chamber for regulating the pressure of the oil in the receptacle and a mercury safety valve of suitable construction on said receptacle, and of the piston lifted by means of the oil in said receptacle, a plate fixed to the upper end of the piston rod, regulators for the supply of volatilized gas to the different evaporators each comprising a casing through which said gases are conducted, a regulating valve inclosed in said casing between the inlet and the outlet for said gases, a strong spring for keeping the valve closed and jointed links connecting the rod of said valve with the plate of said piston in the oil-receptacle, an arm projecting from the joint of the links and a wire connecting said arm with the thermostat in the corresponding cooling room, substantially as described and shown and for the purpose set forth.

In testimony whereof I have hereunto set my hand in presence of two subscribing witnesses.

OLIVIER LEVILLY.

Witnesses:
 HANSON C. COXE.
 ALFRED FREY.